US010173532B2

(12) United States Patent
Nedley et al.

(10) Patent No.: US 10,173,532 B2
(45) Date of Patent: Jan. 8, 2019

(54) SYSTEM AND METHOD FOR CONTROLLING A VEHICLE

(71) Applicant: General Electric Company, Schenectady, NY (US)

(72) Inventors: Kenneth Nedley, Lawrence Park, PA (US); Henry Young, Erie, PA (US); Timothy Brown, Erie, PA (US); Carlos Vallejo, Lawrence Park, PA (US); Jeffrey Wolff, Lawrence Park, PA (US); Sean Cillessen, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/899,261

(22) PCT Filed: Jan. 13, 2015

(86) PCT No.: PCT/US2015/011184
§ 371 (c)(1),
(2) Date: Dec. 17, 2015

(87) PCT Pub. No.: WO2015/106260
PCT Pub. Date: Jul. 16, 2015

(65) Prior Publication Data
US 2016/0318403 A1    Nov. 3, 2016

Related U.S. Application Data

(60) Provisional application No. 61/926,503, filed on Jan. 13, 2014, provisional application No. 61/930,040, filed on Jan. 22, 2014.

(51) Int. Cl.
*B60L 7/26* (2006.01)
*B60T 8/1755* (2006.01)
(Continued)

(52) U.S. Cl.
CPC .............. *B60L 7/26* (2013.01); *B60L 3/102* (2013.01); *B60L 3/108* (2013.01); *B60L 7/28* (2013.01);
(Continued)

(58) Field of Classification Search
CPC .. B60L 7/26; B60L 3/102; B60L 3/108; B60L 7/28; B60L 11/08; B60T 8/1755
See application file for complete search history.

(56) References Cited

U.S. PATENT DOCUMENTS

2003/0057003 A1    3/2003  Kawada et al.
2003/0078700 A1*   4/2003  Chee ................ B60G 17/01908
                                                          701/1
(Continued)

FOREIGN PATENT DOCUMENTS

JP       2009077505 A      4/2009
KR     1020120002637 A      1/2012
WO       2012144058 A1    10/2012

OTHER PUBLICATIONS

International Search Report and Written Opinion issued in connection with corresponding PCT application PCT/US2015/011184 dated Apr. 23, 2015.

*Primary Examiner* — Thomas G Black
*Assistant Examiner* — Sze-Hon Kong
(74) *Attorney, Agent, or Firm* — GE Global Patent Operation; John A. Kramer (57) ABSTRACT

A braking system for a vehicle includes an electric drive system associated with a first set of wheels. The electric drive system is configured to selectively provide electric motive power to the first set of wheels of the vehicle to propel the vehicle and electric retarding to slow the vehicle. The system further includes a friction brake system associated with a second set of wheels of the vehicle, and a controller for selectively actuating the electric drive system (Continued)

to operate in an electric retarding mode and for selectively actuating the friction brake system. The controller is configured to transfer retarding force from the first set of wheels to the second set of wheels, and/or to determine wheel speed signal accuracies, in either case to mitigate vehicle/wheel sliding or slipping.

13 Claims, 4 Drawing Sheets

(51) Int. Cl.
  *B60L 3/10* (2006.01)
  *B60L 7/28* (2006.01)
  *B60L 11/08* (2006.01)
(52) U.S. Cl.
  CPC ............. *B60L 11/08* (2013.01); *B60T 8/1755* (2013.01); *B60L 2200/36* (2013.01); *B60L 2200/40* (2013.01); *B60L 2210/30* (2013.01); *B60L 2210/40* (2013.01); *B60L 2220/12* (2013.01); *B60L 2220/46* (2013.01); *B60L 2240/22* (2013.01); *B60L 2240/36* (2013.01); *B60L 2240/421* (2013.01); *B60L 2240/461* (2013.01); *B60L 2240/463* (2013.01); *B60L 2240/465* (2013.01); *B60L 2240/622* (2013.01); *B60L 2240/647* (2013.01); *B60L 2240/667* (2013.01); *B60L 2250/16* (2013.01); *B60L 2250/26* (2013.01); *B60Y 2200/92* (2013.01); *Y02T 10/642* (2013.01); *Y02T 10/70* (2013.01); *Y02T 10/7077* (2013.01); *Y02T 10/7241* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 2006/0185914 A1 | 8/2006 | Hommi | |
| 2009/0101428 A1* | 4/2009 | Itoh | B60T 8/175 180/197 |
| 2011/0295457 A1* | 12/2011 | Linda | B60T 8/172 701/498 |
| 2012/0116617 A1* | 5/2012 | Schaffler | B60L 3/10 701/20 |
| 2014/0046568 A1* | 2/2014 | Kato | B60L 9/18 701/84 |
| 2016/0039311 A1* | 2/2016 | Kato | B60L 3/0076 701/22 |

* cited by examiner

FIG. 4 ered from reading the following description of non-limiting embodi-
SYSTEM AND METHOD FOR CONTROLLING A VEHICLE

FIELD OF THE INVENTION

Embodiments of the invention relate generally to control systems for vehicles. Other embodiments relate to vehicle braking control systems.

BACKGROUND OF THE INVENTION

Large off-highway vehicles ("OHVs"), such as mining vehicles used to haul heavy payloads excavated from open pit mines, may employ motorized wheels for propelling or retarding the vehicle in an energy efficient manner. In some such vehicles, this efficiency is obtained by employing a large-horsepower diesel engine in conjunction with an alternator and an electric drive system, which may include a main traction inverter and a pair of wheel drive assemblies housed within the rear tires of the vehicle. A drive shaft of the diesel engine is mechanically coupled to the alternator, for driving the alternator to generate electricity. The electricity generated by the alternator is routed to the main traction inverter, which supplies electrical power having a controlled voltage and frequency to electric drive motors of the two wheel drive assemblies. Each wheel drive assembly houses a planetary gear transmission that converts the rotation of the associated drive motor energy into a high-torque, low-speed rotational energy output which is supplied to the rear wheels.

Braking of these large OHVs is typically accomplished using a "blended" brake system, that is, a combination of the electric drive system and friction brakes associated with the front and rear wheels. In particular, the electric drive system may be utilized not only to propel the vehicle, but to apply retarding tractive effort to the rear wheels to effect braking of the vehicle, as desired. In addition, or alternatively, the front and rear friction brakes may be applied in certain situations to bring the vehicle to a stop or to maintain the position of the vehicle when stopped. As will be readily appreciated, depending on the specific circumstance or application, the electric drive system, the front friction brakes, and the rear friction brakes, or a combination of one or more of these braking elements, may be utilized for vehicle stopping and holding.

Operating loads in an OHV may exceed one hundred tons, while the gross weight of the vehicle and load may be several hundred tons. Operating these vehicles on grade and in wet conditions, therefore, can present challenges. In addition, operating such heavy vehicles in challenging conditions necessitates that the braking systems on board the vehicle operate efficiently and reliably to safely control vehicle speed and stopping, for example, to reduce or mitigate sliding and spinning conditions.

BRIEF DESCRIPTION OF THE INVENTION

In an embodiment, a system (e.g., control system) includes an electric drive system associated with at least a first set of wheels of a vehicle. The electric drive system is configured to selectively provide electric motive power to the first set of wheels of the vehicle to propel the vehicle and electric retarding to slow the vehicle. The system further includes a friction brake system associated with at least a second set of wheels of the vehicle, and at least one controller for selectively actuating the electric drive system to operate in an electric retarding mode and for selectively actuating the friction brake system. The at least one controller is configured to control the electric drive system and the friction brake system for a transfer of retarding force from the first set of wheels to the second set of wheels in dependence at least in part upon a determined slip of the first set of wheels.

In another embodiment, a method of controlling a vehicle includes controlling, with one or more controllers, a first retarding force applied by an electric drive system to a first set of wheels of the vehicle. The method further includes determining, with the one or more controllers, an extent of slip of the first set of wheels, and controlling a reduction in the first retarding force applied to the first set of wheels until the extent of slip of the first set of wheels falls within a predetermined range. The method further includes controlling application of a second retarding force to a second set of wheels of the vehicle. The second retarding force is based on (e.g., substantially equal to) the reduction in the first retarding force of the first set of wheels.

In another embodiment, a system (e.g., control system for a vehicle) includes plural wheel speed sensors respectively associated with plural wheels of a vehicle. (In an embodiment, the plural wheels include a right rear wheel, a left rear wheel, a right front wheel, and a left front wheel, e.g., generally disposed at the four corners of the vehicle.) The system further includes at least one controller, and an electric drive system that is associated with at least two of the plural wheels. The electric drive system is configured to selectively provide electric motive power to the at least two of the plural wheels of the vehicle to propel the vehicle and electric retarding to slow the vehicle. The at least one controller is in electrical communication with the wheel speed sensors and is configured to receive wheel speed signals from the wheel speed sensors indicative of wheel speeds of the plural wheels. The at least one controller is further configured to control the vehicle based on determined respective wheel speed signal accuracies of the wheel speed signals. For example, the at least one controller may be configured to control the electric retarding of the electric drive system based in part on the determined respective wheel speed signal accuracies of the wheel speed signals, to reduce and/or eliminate spinning or sliding of the vehicle and/or vehicle wheels.

In another embodiment, a method of controlling a vehicle includes receiving, at one or more controllers, wheel speed signals from plural wheel speed sensors respectively associated with plural wheels of the vehicle. (In an embodiment, the plural wheels include a right rear wheel, a left rear wheel, a right front wheel, and a left front wheel.) The method further includes determining, with the one or more controllers, respective wheel speed signal accuracies of the wheel speed signals, and controlling electric retarding provided by an electric drive system associated with at least two of the plural wheels. The electric drive system is configured to selectively provide electric motive power to the at least two of the plural wheels of the vehicle to propel the vehicle and the electric retarding to slow the vehicle. The electric retarding is controlled based at least in part on the wheel speed signals and the wheel speed signal accuracies to reduce and/or eliminate spinning or sliding of the vehicle and/or vehicle wheels.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Reference will be made below in detail to exemplary embodiments of the invention, examples of which are illustrated in the accompanying drawings. Wherever possible, the same reference numerals used throughout the drawings refer to the same or like parts. Although embodiments of the invention are described with respect to haul trucks having a diesel engine that are utilized in the surface mining industry, embodiments of the invention are also applicable for use with internal combustion engines and vehicles employing such engines, generally. For example, the vehicles may be off-highway vehicles ("OHVs") designed to perform an operation associated with a particular industry, such as mining, construction, farming, etc., and may include haul trucks, cranes, earth moving machines, mining machines, farming equipment, tractors, material handling equipment, earth moving equipment, etc. Alternatively or additionally, the vehicles may be on-road vehicles, such as tractor-trailer rigs, on-road dump trucks, automobiles, etc.

Embodiments of the invention relate to systems and methods for controlling a vehicle, e.g., braking control, during slippery/low friction conditions. In one embodiment, vehicle drivability in slippery/wet conditions may be improved by determining when electric drive wheels (e.g., rear wheels) of the vehicle cannot provide enough retarding tractive effort (i.e., braking) to control vehicle speed, and redirecting braking force to other wheels of the vehicle via friction brakes or electrical retarding. In another embodiment, vehicle/wheel slipping or sliding is reduced by determining wheel true ground speed (e.g., true ground speed at each corner of the vehicle), and using this information to control vehicle braking and/or tractive effort.

Figure 1:
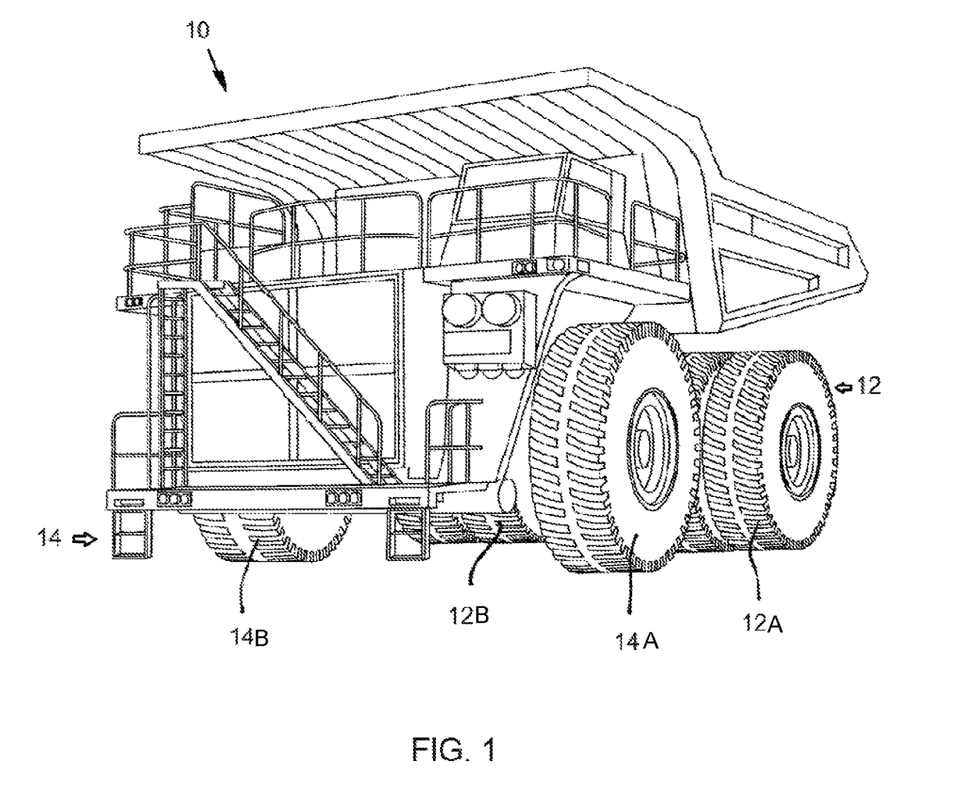
FIG. 1 is a perspective view of a vehicle, according to an embodiment of the invention.

FIG. 1 illustrates a vehicle 10 in which an embodiment of a control system 16 (see FIG. 3) may be incorporated. The vehicle 10, as illustrated, is a haul truck configured for use in high production mining and heavy-duty construction environments, and includes a first set of wheels 12 and a second set of wheels 14. (The haul truck 10 is illustrative of vehicles generally, although in embodiments, a system and/or method of the invention is implemented on a haul truck specifically.) The wheels 12 in the first set are drive wheels coupled to an electric drive system 100 (see FIG. 2) that provides motive power to the haul truck 10. In at least one mode of operation of the vehicle 10, power is routed from the electric drive system 100 to the first set of wheels 12, which are thereby actuated to provide tractive effort to move the vehicle. The second set of wheels 14 may be drive wheels or they may be non-drive wheels, meaning coupled to the electric drive system 100 (for actuation, in at least one mode of operation of the vehicle, to provide tractive effort to help move the vehicle) or not coupled to the electric drive system 100 (incapable of being powered to provide tractive effort to move the vehicle), respectively. The first set of wheels 12 may be co-axial (e.g., rear wheels), and the second set of wheels 14 may be co-axial (e.g., front wheels). The wheels 12 of the first set may not include any wheels 14 of the second set, and vice versa, i.e., none of the wheels of the first set are included in the second set and none of the wheels of the second set are included in the first set. Also, the first set of wheels 12 may include first and second wheels 12a, 12b (e.g., left and right rear wheels, respectively), and the second set of wheels 14 may include third and fourth wheels 14a, 14b (e.g., left and right front wheels, respectively).

Figure 2:
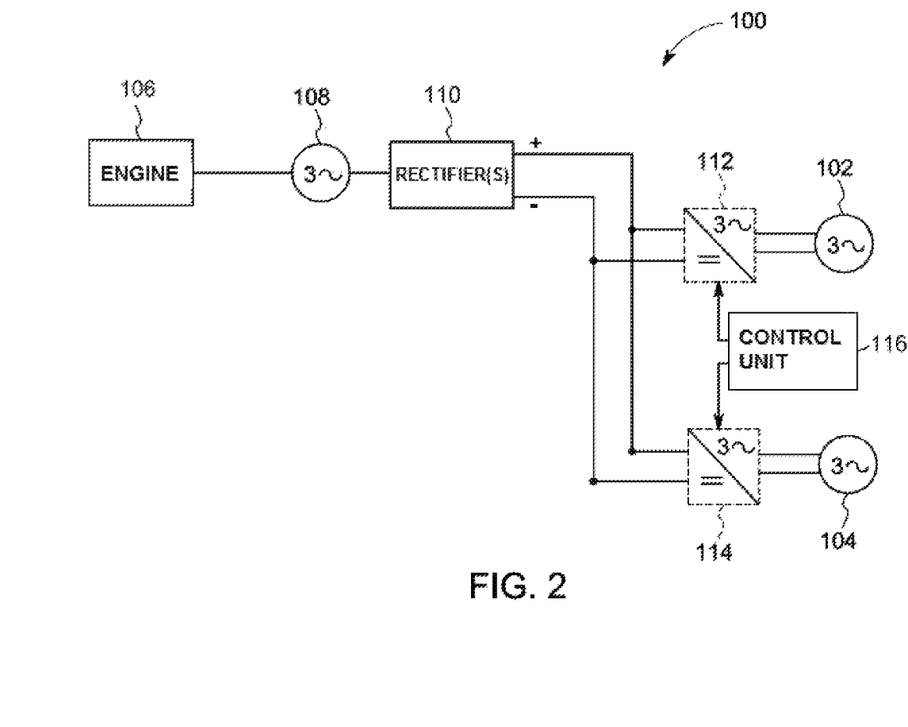
FIG. 2 is a schematic diagram of an electric drive and retarding system, according to an embodiment.

An embodiment of the electric drive system 100 is shown in FIG. 2. The electric drive system 100 is at least partially housed within the vehicle 10, and includes a three-phase alternating current (AC) generator/alternator 108 that is coupled to be mechanically driven by an engine 106 (e.g., a diesel engine). An AC output of the generator 108 is fed into one or more rectifiers 110, which are configured to convert the AC output of the generator/alternator 108 to a direct current (DC) output. The DC output of the rectifiers 110 is supplied to a DC bus, which (among other loads) feeds into a set of inverters 112, 114. The inverters 112, 114 are configured to convert DC power from the DC bus into controlled three-phase, variable frequency AC power. Outputs of the inverters 112, 114 are electrically connected to electric motors 102, 104 (respectively), and the AC power output by the inverters 112, 114 has a waveform suitable for driving the electric motors 102, 104. The electric motors 102, 104 are operably coupled to the drive wheels 12 of the first set of wheels. For example, the motors 102, 104 may be three-phase, AC induction wheel motors. If the second set of wheels 14 are drive wheels, then the electric drive system 100 would include additional inverters and electric motors coupled similarly to the inverters 112, 114 and motors 102, 104 in FIG. 2.

As further shown in FIG. 2, a drive system control unit 116 is electrically coupled to the electric drive system 100. For example, the drive system control unit may be connected to the inverters 112, 114. The drive system control unit 116, among other tasks, is configured to determine and send a desired torque request signal to the inverters 112, 114. The torque request signal is processed by the control unit for the inverters 112, 114 to drive the motors 102, 104 to the desired torque output magnitude, and in the desired rotational direction corresponding to the intended direction of vehicle movement. The control unit is also configured to control the motors 102, 104 to provide retarding tractive effort to the wheels 12 (e.g., rear wheels) to slow or stop the vehicle 10. In particular, when operating in an electric braking mode, also known as electric retarding, the electric motors 102, 104 are reversed to act as generators, and the drive wheels 12 of the vehicle 10 drive the electric motors 102, 104. Driving the motors 102, 104 places a torque on the drive wheels 12 and causes them to slow, thus braking the vehicle. In an embodiment, the control unit 116 includes one or more microprocessors operating according to a set of stored instructions to provide for vehicle control, as discussed in detail below and elsewhere herein.

Figure 3:
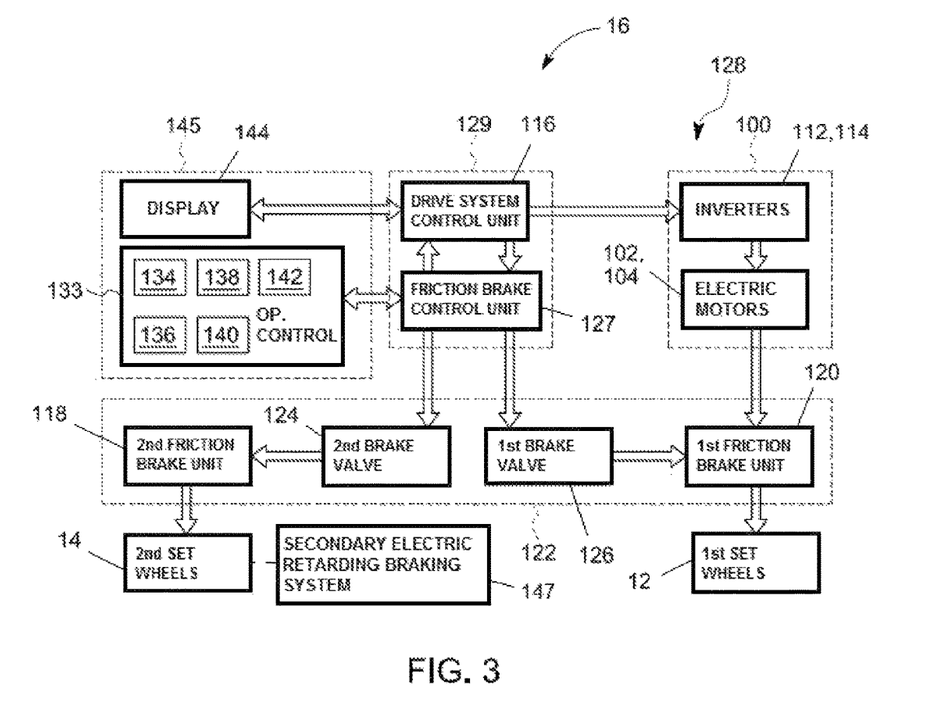
FIG. 3 is a block diagram illustrating a control system, according to an embodiment.

FIG. 3 shows an embodiment of the control system (e.g., braking control system) 16 in more detail. The control system 16 includes (or at least is configured to control) a friction brake system 122 that includes a first (e.g., rear) friction brake unit 120 (e.g., friction brake actuation unit) associated with the first set of wheels 12 (e.g., rear wheels) of the vehicle and a second (e.g., front) friction brake unit 118 (e.g., friction brake actuation unit) associated with the second set of wheels 14 (e.g., front wheels) of the vehicle. In an embodiment, the friction brake system 122 is a hydraulic brake system, which further includes a first (e.g., rear) brake solenoid valve 126 that is controllable to control the pressure of hydraulic fluid to the first friction brake unit 120, and a second (e.g., front) brake solenoid valve 124 that is controllable to control the pressure of hydraulic fluid to the second friction brake unit 118. In other embodiments, other means for actuating the first and second friction brake units 120, 118 may also be utilized without departing from the broader aspects of the present invention. In either (or any) embodiment, each friction brake unit may include, for example, respective components for controllably applying a friction load to a moving part associated with a wheel 12, 14, e.g., brake pads operably coupled with a vehicle axle or brake disc/rotor, hydraulically-actuated calipers for applying a force to the brake pads against the disc/rotor, and so on. The control system 16 further includes a friction brake control unit 127 that is configured to control application of the first and second (e.g., rear and front) friction brake units 120, 118 at least partially in response to operator inputs, such as the depression of a brake pedal.

In an embodiment, the drive system control unit 116 and friction brake control unit 127 are electrically coupled to one another and may be generally referred to as at least one controller (i.e., one or more controllers) 129. While the drive system control unit 116 and friction brake control unit 127 are illustrated as separate components in FIG. 3, in embodiments, the control units 116, 127 may be integrated into a single control unit/controller/processor.

As further shown in FIG. 3, the drive system control unit 116 is electrically coupled to the drive-train 128 of the vehicle 10, which includes the electric drive system 100, e.g., engine 106, generator 108, rectifier 110, inverters 112, 114, and drive motors 102, 104 (AC induction wheel motors as shown in FIG. 2, or otherwise). When braking the vehicle 10 in an electric retarder braking mode, the control unit 116 commands the electric drive system 100 (acting in effect as an electric retarding system that includes the inverters 112, 114, and motors 102, 104) to provide a requested desired vehicle retarding torque to the wheels.

As also shown in FIG. 3, one or both of drive system control unit 116 and/or the friction brake control unit 127 may be configured to receive inputs from an operator control 133, e.g., an ignition switch 134, an accelerator position transducer 136, a brake pedal position transducer 138, and/or a gear selector 140, for operating the electric motors 102, 104 for driving and braking the vehicle 10. The ignition switch 134 is operable to turn the vehicle on and off. The accelerator position transducer 136 is configured to detect a position of an accelerator pedal or other actuator. The brake pedal position transducer 138 is configured to detect a position of a brake pedal or other actuator. The gear selector 140 provides an input for permitting an operator to select an intended or desired direction of vehicle movement, such as forward movement or reverse movement. In addition or alternatively, the operator control may comprise another type of input interface 142, e.g., steering wheel or other steering controls, touchscreen or other computer interface, control input from a control system or autonomous controller, and so on. As further shown in FIG. 3, a display 144 may be electrically coupled to the drive system control unit 116 to allow an operator of the vehicle 10 to view status information relating to various vehicle systems. The display 144 and operator control(s) 133 collectively form an I/O (input/output) system 145.

With further reference to FIG. 3, an embodiment of the control system 16 is configured to improve vehicle driveability by determining when the first set of wheels 12 (e.g., rear wheels of the vehicle) and electric drive system 100 (acting in the electric retarding/electric braking mode) cannot provide sufficient retarding tractive effort to control vehicle speed. In connection with this, if it is determined that the electric drive system 100 cannot provide enough braking tractive effort (e.g., of the first set of wheels 12) to control vehicle speed, the system 16 is further configured to redirect/transfer tractive effort braking force (i.e., retarding force) to the second set of wheels 14 (e.g., front wheels) via the second (e.g., front) friction brake unit 118 or electrical retarding (by a secondary electric retarding braking system 147) so that sufficient braking force is available. ("Secondary" electric retarding braking system 147 refers to an electric retarding braking system that is different than the system that provides the electric retarding to the first set of wheels 12. For example, if the vehicle is an all-wheel/4-wheel drive vehicle that includes electric drive motors on both sets of wheels 12, 14, then the motors 102, 104 and inverters 112, 114 associated with the first set of wheels 12 would be a first or primary electric regarding braking system, and electric drive motors associated with the second set of wheels 14, as controlled for electric braking by additional inverters connected/configured similarly to inverters 112, 114 described above, would be a second or secondary electric retarding braking system.) The transfer of retarding force includes a reduction in the electric retarding/electric braking of the first set of wheels, and a substantially equal (e.g., no more than 5% difference) application of braking force (electric retarding or friction) to the second set of wheels.

In operation, in an embodiment, when an operator of the vehicle 10 requests braking (e.g., while traveling up or down an inclined grade), the drive system control unit 116 is configured to first control application of electric braking/retarding to the first set of wheels 12, which may be the rear wheels of the vehicle. The drive system control unit 116 controls slip of the first set of wheels 12 by comparing their rotational speed (as determined, for example, from a tachometer or other speed sensor) with a reference speed. (The reference speed can be determined or obtained in various ways, see U.S. Pat. No. 5,719,770 and U.S. Pat. No. 6,499,815, both of which are incorporated by reference, for two examples.) When the slip of the first set of wheels 12 exceeds a designated ratio or threshold stored in memory of the drive system control unit 116, the retarding force provided by the electric drive system 100 is reduced to maintain the slip within a designated range (e.g., under the designated threshold). The retarding force applied, along with an estimated normal force on the first set of wheels 12 (determined from, for example, strut pressure, gross vehicle weight measurement or estimate, payload meter reading, grade, etc.), may then be utilized to determine how much retarding or the tire-to-ground patch can handle (i.e., the tire-to-ground friction capacity).

The drive system control unit 116 will then attempt to apply the amount of retarding force (i.e., retarding tractive effort) removed from the first set of wheels 12 (e.g., rear wheels) to the second set of wheels 14 (e.g., front wheels) via friction brakes 118 or secondary electric retarding 147. In an embodiment, the drive system control unit 116 communicates with the friction brake control unit 127 to request that the friction brake control unit 127 apply the amount of retarding force removed from the first set of wheels 12 to the second set of wheels 14, as a friction brake application. (Because of brake system variances and/or operational transients, the actual amount of the friction brake application applied to the second set of wheels may vary slightly from the reduction in retarding force to the first set of wheels, and as such may be equal thereto, or substantially equal thereto.)

In an embodiment, the system 16 is configured for the retarding force transferred from the first set of wheels 12 to the second set of wheels 14 to be limited by the maximum tire ground force, which is estimated utilizing the effective traction friction and normal force on one or more of the second set of wheels 14. Utilizing a speed differential between independent wheels on the vehicle, in which one of the wheels being compared is applying a retarding load to the vehicle and the other has no retarding load applied on it, the system 16 determines the amount of retarding load that can be applied to the first wheel set while matching a ratio of speed to the second wheel set.

As discussed above, utilizing the suspension pressure, estimated gross vehicle weight, or a payload meter reading system, the system 16 (e.g., drive system control unit 116) determines a first normal force on one or more of the first set of wheels and a second normal force on one or more of the second set of wheels. From the applicable load determined from the speed comparison and the determined normal force(s), the system 16 calculates the friction force the tire-to-ground contact patch can handle (i.e., the tire-to-ground friction capacity).

Additionally, the system 16 may be configured to determine a capacity of the second friction brake unit 118 based on brake temperature, wheel speed, estimated brake wear, and brake oil flow and/or pressure.

In embodiments, therefore, the system 16 is configured to determine the amount of retarding force to be transferred from the first set of wheels 12 (e.g., rear wheels) to the second set of wheels 14 (e.g., front wheels), limited by (i) the amount of retarding capacity the first (e.g., front) friction brake unit 118 (and/or secondary electric retarding braking system 147) can provide and (ii) the amount of friction force the tire-to-ground contact patch (of the second set of wheels) can transfer to the ground (i.e., the tire-to-ground friction capacity). Thus, the system 16 may be configured to implement a method comprising controlling, with one or more controllers 129, a first retarding force applied by the electric drive system 100 to the first set of wheels 12; determining, with the one or more controllers, a slip of the first set of wheels 12; controlling, with the one or more controllers, a reduction in the first retarding force applied to the first set of wheels 12 until the slip falls within a designated range (this step may be contingent upon the determined slip being above a designated limit/threshold); and controlling, with the one or more controllers, application of a second retarding force to the second set of wheels 14. The second retarding force is based on the reduction in the first retarding force of the first set of wheels. For example, the second retarding force may be substantially equal to the reduction in the first retarding force, and limited by a braking capacity (of friction brakes or electric retarding) at the second set of wheels and an amount of friction force the tire-to-ground contact patch of the second set of wheels can handle (i.e., the tire-to-ground friction capacity). Here, the system 16 may be configured for the retarding force that is in-effect transferred from the first set of wheels to the second set of wheels to be the lesser of the reduction in the first retarding force, the braking capacity at the second set of wheels, and the determined amount of friction force of the tire-to-ground contact patch (i.e., tire-to-ground friction capacity). Alternatively, the second retarding force (applied to the second set of wheels) may be substantially equal to the reduction in the first retarding force (at the first set of wheels), and the latter (the reduction) limited to no more than the braking capacity or determined amount of friction force of the tire-to-ground contact patch, whichever is lower. As a result, driveability in slippery and wet conditions may be improved. In addition, this obviates the need to determine the ground friction capacity in order to accurately adjust retarding load between independent wheels.

Figure 4:
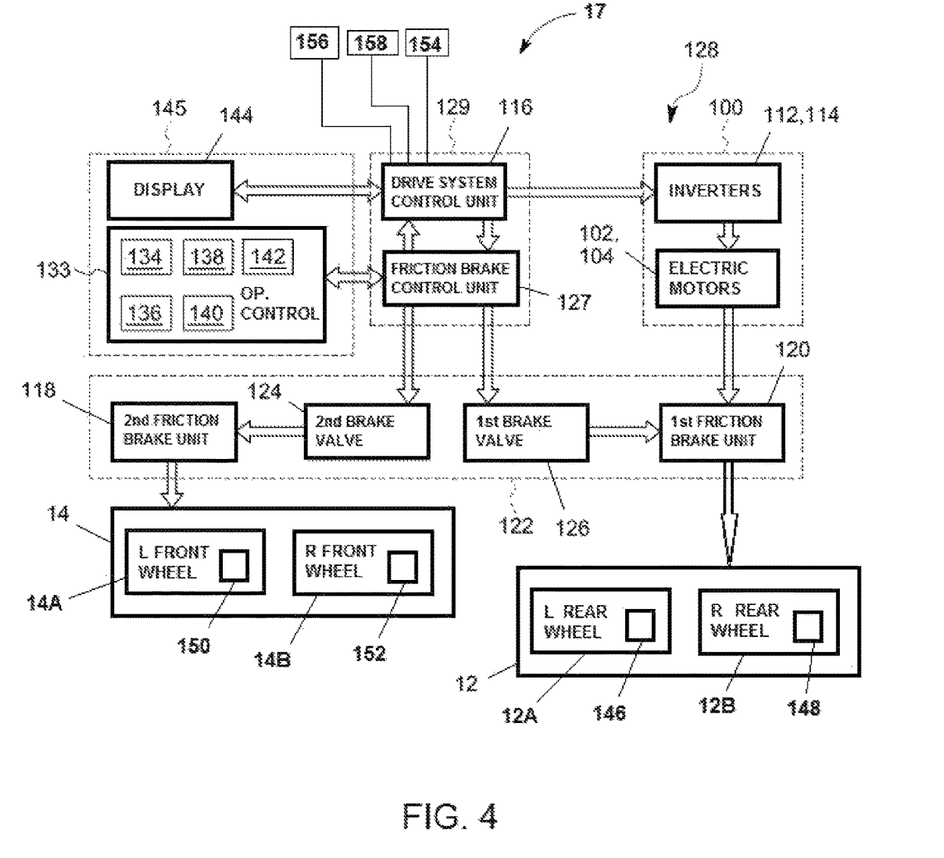
FIG. 4 is a block diagram illustrating a control system, according to another embodiment.

FIG. 4 shows another embodiment of a control system 17. (Elements numbered the same in FIG. 4 as those in FIG. 3 are the same or similar as described above.) The control system 17 is configured to determine if the vehicle 10 is spinning or sliding, as well as the center of rotation of the vehicle 10, by determining the respective true ground speed of each of the four corners of the vehicle 10. As shown in FIG. 4, in an embodiment, the four corners of the vehicle 10 are defined by the left rear wheel 12*a* and right rear wheel 12*b* of the drive wheel set 12, and the left front wheel 14*a* and right front wheel 14*b* of the front wheel set 14. Each of the wheels 12*a*, 12*b*, 14*a*, 14*b* has a sensor 146, 148, 150, 152 associated therewith (respectively) for sensing wheel speed. The sensors 146, 148, 150, 152 are in electrical communication (wired or wireless) with the one or more controllers 129. In an embodiment, the wheel speed sensors 146, 148, 150, 152 are tachometers operably coupled to the rotating parts of the wheels.

In the system 17, the one or more controllers 129 are also configured to receive variable inputs from a GPS unit or other position system 154 on board the vehicle 10 that provides information indicating vehicle location, ground speed, and direction of travel, as well as yaw information from one or more yaw sensors (such as a front yaw sensor 156 and a rear yaw sensor 158), wheel electric retarding effort feedback/information from the drive system 100, friction brake feedback/information from the front friction brake unit 118 and/or the rear friction brake unit 120, and/or tire-to-ground friction capacity/slip limit (as determined, for example, as discussed above in regards to the system 16 of FIG. 3). In addition, the one or more controllers 129 receive fixed inputs (e.g., from memory) indicative of tire geometry for each of the wheels 12*a*, 12*b*, 14*a*, 14*b*, front wheel moment of inertia, rear wheel moment of inertia, and vehicle geometry (e.g., shape, width, length, height, axle height, etc.)

In operation, the one or more controllers 129 of the control system 17 are configured to receive wheel speed signals from the wheel speed sensors 146, 148, 150, 152 indicative of wheel speeds of the plural wheels 12*a*, 12*b*, 14*a*, 14*b*. The one or more controllers are further configured to determine respective wheel speed signal accuracies of the wheel speed signals, determine true ground speeds of all four corners of the vehicle 10, and determine if the wheels and/or the vehicle are spinning or sliding so that corrective action may be undertaken.

In particular, in an embodiment, the one or more controllers 129 receive the wheel speed sensor signals, and utilize one or more of electrical retarding effort feedback/information from the electric drive system 100, friction brake feedback/information from the front friction brake system 118 and/or the rear friction brake system 120, tire-to-ground friction capacity, tire geometry, and wheel inertias to determine respective accuracies of the wheel speed sensor signals. (The respective accuracies may be one accuracy applicable to all of the wheel speed sensor signals, or a respective different accuracy for each of the wheel speed sensor signals.)

The one or more controllers 129 are further configured to determine the true ground speeds of all four corners (i.e., left and right rear wheels 12*a*, 12*b* and left and right front wheels 14*a*, 14*b*) of the vehicle 10 once the accuracies of the wheel speed sensor signals have been determined. In particular, in order to determine respective true ground speed of each wheel, the one or more controllers 129 first determine the baseline ground speed and direction of travel of the vehicle 10 from the differential GPS information provided by the GPS unit 154. The one or more controllers 129 then compare these baseline wheel speeds with incorporated accuracy, yaw sensor information (from the yaw sensors 156, 158), and vehicle geometry to determine the angular motion of the vehicle. Using the baseline ground speed and direction of travel, along with the angular motion of the vehicle 10, the one or more controllers 129 then determine the ground speed and direction of travel of each of the wheels 12a, 12b, 14a, 14b.

In the system 17, the one or more controllers 129 are further configured to then determine if the wheels of the vehicle and/or the vehicle 10 are spinning or sliding. In particular, the one or more controllers 129 utilize the wheel speed signals with incorporated accuracy (e.g., wheel speeds as corrected by the determined accuracies), four-corner ground speed direction of travel, and vehicle geometry to determine if the wheels and/or the vehicle are spinning or sliding. If it is determined that the vehicle 10 is spinning or sliding, the center of rotation of the vehicle 10 can then be calculated using the previously calculated values and the yaw sensor inputs (from front yaw sensor 156 and rear yaw sensor 158).

If it is determined that the vehicle 10 is spinning or sliding, the one or more controllers 129 utilize the various inputs and calculations discussed above to control wheel retarding effort to minimize and/or eliminate vehicle 10 spinning or sliding conditions. In particular, in response to spinning or sliding determinations, and in connection with the various inputs received by the controller(s) 129, the one or more controllers 129 (via the drive system control unit 116 and/or friction brake control unit 127) are configured to command the electric drive system 100 (acting in its electric retarding mode) and/or front and rear friction brake units 118, 120 to apply or reduce braking effort to reduce or eliminate spinning and sliding conditions. In an embodiment, the controllers 129 are configured to determine precisely how much propel or retard effort to apply to each wheel 12a, 12b, 14a, 14b to reduce spinning or sliding conditions.

Embodiments of the invention are applicable, as noted above, to relatively large vehicles, for example, haul trucks and other vehicles having a gross vehicle operating weight of at least 250 metric tons. However, while the present invention has been described with specific reference to OHV's and other large vehicles of this type, the present invention is not intended to be so limited in this regard. In particular, it is contemplated that the present invention is equally applicable to electric vehicles generally, including but not limited to, electric off-highway vehicles, automobiles, and the like.

In embodiments, aspects of the system 16 and system 17 are combined, e.g., a system for a vehicle that is configured to control vehicle braking (electric retarding and friction) both based on determined wheel slip/retarding force transfer and four-corner vehicle speed accuracies.

In an embodiment, a system (e.g., control system) includes an electric drive system associated with at least a first set of wheels of a vehicle. The electric drive system is configured to selectively provide electric motive power to the first set of wheels of the vehicle to propel the vehicle and electric retarding to slow the vehicle. The system further includes a friction brake system associated with at least a second set of wheels of the vehicle, and at least one controller for selectively actuating the electric drive system to operate in an electric retarding mode and for selectively actuating the friction brake system. The at least one controller is configured to control the electric drive system and the friction brake system for a transfer of retarding force from the first set of wheels to the second set of wheels in dependence at least in part upon a determined slip of the first set of wheels. Alternatively or additionally, the at least one controller may be configured to control the electric drive system and the friction brake system for the transfer of retarding force from the first set of wheels to the second set of wheels in dependence at least in part upon a determined amount of available retarding force at the first set of wheels and/or a determined amount of available retarding force at the second set of wheels (e.g., braking capacity of friction brakes or secondary electric retarding, or tire-to-ground friction capacity). The first set of wheels may be rear wheels of the vehicle, and the second set of wheels may be front wheels of the vehicle.

In an embodiment, a system (e.g., control system) includes an electric drive system associated with at least a first set of wheels of a vehicle. The electric drive system is configured to selectively provide electric motive power to the first set of wheels of the vehicle to propel the vehicle and electric retarding to slow the vehicle. The system further includes a friction brake system associated with at least a second set of wheels of the vehicle, and at least one controller for selectively actuating the electric drive system to operate in an electric retarding mode and for selectively actuating the friction brake system. The at least one controller is configured to control the electric drive system and the friction brake system for a transfer of retarding force from the first set of wheels to the second set of wheels in dependence at least in part upon a determined slip of the first set of wheels. The transfer of retarding force comprises a reduction in an amount of the electric retarding applied by the electric drive system to the first set of wheels and a substantially equal increase in an amount of friction braking applied by the friction brake system to the second set of wheels. The first set of wheels may be rear wheels of the vehicle, and the second set of wheels may be front wheels of the vehicle.

In an embodiment, a system (e.g., control system) includes an electric drive system associated with at least a first set of wheels of a vehicle. The electric drive system is configured to selectively provide electric motive power to the first set of wheels of the vehicle to propel the vehicle and electric retarding to slow the vehicle. The system further includes a friction brake system associated with at least a second set of wheels of the vehicle, and at least one controller for selectively actuating the electric drive system to operate in an electric retarding mode and for selectively actuating the friction brake system. The at least one controller is configured to control the electric drive system and the friction brake system for a transfer of retarding force from the first set of wheels to the second set of wheels in dependence at least in part upon a determined slip of the first set of wheels. The at least one controller is configured to control the electric drive system to apply a first retarding force to the first set of wheels of the vehicle, and wherein the transfer of retarding force comprises the at least one controller configured to determine the slip of the first set of wheels, control a reduction in the first retarding force applied to the first set of wheels until the slip of the first set of wheels falls within a designated range, and control application of a second retarding force to the second set of wheels, wherein the second retarding force is substantially equal to the reduction in the first retarding force of the first set of wheels. The first set of wheels may be rear wheels of the vehicle, and the second set of wheels may be front wheels of the vehicle.

In an embodiment, a system (e.g., control system) includes an electric drive system associated with at least a first set of wheels of a vehicle. The electric drive system is configured to selectively provide electric motive power to the first set of wheels of the vehicle to propel the vehicle and electric retarding to slow the vehicle. The system further includes a friction brake system associated with at least a second set of wheels of the vehicle, and at least one controller for selectively actuating the electric drive system to operate in an electric retarding mode and for selectively actuating the friction brake system. The at least one controller is configured to control the electric drive system and the friction brake system for a transfer of retarding force from the first set of wheels to the second set of wheels in dependence at least in part upon a determined slip of the first set of wheels. The at least one controller includes a drive system control unit and a friction brake control unit in electrical communication with the drive system control unit. The friction brake control unit is configured to command the friction brake system to a predetermined braking force at the second set of wheels. The drive system control unit is configured to apply a predetermined torque to the first set of wheels. The first set of wheels may be rear wheels of the vehicle, and the second set of wheels may be front wheels of the vehicle.

In an embodiment, a system (e.g., control system) includes an electric drive system associated with at least a first set of wheels of a vehicle. The electric drive system is configured to selectively provide electric motive power to the first set of wheels of the vehicle to propel the vehicle and electric retarding to slow the vehicle. The system further includes a friction brake system associated with at least a second set of wheels of the vehicle, and at least one controller for selectively actuating the electric drive system to operate in an electric retarding mode and for selectively actuating the friction brake system. The at least one controller is configured to control the electric drive system and the friction brake system for a transfer of retarding force from the first set of wheels to the second set of wheels in dependence at least in part upon a determined slip of the first set of wheels. The at least one controller is configured to determine an amount of the retarding force to transfer from the first set of wheels to the second set of wheels. The first set of wheels may be rear wheels of the vehicle, and the second set of wheels may be front wheels of the vehicle.

In an embodiment, a method of controlling a vehicle includes controlling, with one or more controllers, a first retarding force applied by an electric drive system to a first set of wheels of the vehicle. The method further includes determining, with the one or more controllers, an extent of slip of the first set of wheels, and controlling a reduction in the first retarding force applied to the first set of wheels until the extent of slip of the first set of wheels falls within a predetermined range. The method further includes controlling application of a second retarding force to a second set of wheels of the vehicle. The second retarding force is based on (e.g., substantially equal to) the reduction in the first retarding force of the first set of wheels. The second retarding force may be applied by a friction braking system, or by a secondary electric retarding braking system.

In another embodiment, a system (e.g., control system for a vehicle) includes plural wheel speed sensors respectively associated with plural wheels of a vehicle. (The plural wheels may include a right rear wheel, a left rear wheel, a right front wheel, and a left front wheel, e.g., generally disposed at the four corners of the vehicle.) The system further includes at least one controller, and an electric drive system that is associated with at least two of the plural wheels. The electric drive system is configured to selectively provide electric motive power to the at least two of the plural wheels of the vehicle to propel the vehicle and electric retarding to slow the vehicle. The at least one controller is in electrical communication with the wheel speed sensors and is configured to receive wheel speed signals from the wheel speed sensors indicative of wheel speeds of the plural wheels. The at least one controller is further configured to control the vehicle based on determined respective wheel speed signal accuracies of the wheel speed signals. For example, the at least one controller may be configured to control the electric retarding of the electric drive system based in part on the determined respective wheel speed signal accuracies of the wheel speed signals, to reduce and/or eliminate spinning or sliding of the vehicle and/or vehicle wheels.

In another embodiment, a system (e.g., control system for a vehicle) includes plural wheel speed sensors respectively associated with plural wheels of a vehicle. (The plural wheels may include a right rear wheel, a left rear wheel, a right front wheel, and a left front wheel, e.g., generally disposed at the four corners of the vehicle.) The system further includes at least one controller, and an electric drive system that is associated with at least two of the plural wheels. The electric drive system is configured to selectively provide electric motive power to the at least two of the plural wheels of the vehicle to propel the vehicle and electric retarding to slow the vehicle. The at least one controller is in electrical communication with the wheel speed sensors and is configured to receive wheel speed signals from the wheel speed sensors indicative of wheel speeds of the plural wheels. The at least one controller is further configured to control the vehicle based on determined respective wheel speed signal accuracies of the wheel speed signals. In particular, the at least one controller is configured to: at least one of determine or receive first information relating to operation of the electric drive system; at least one of determine or receive second information relating to operation of a friction brake system operably coupled with at least one of the plural wheels; and determine a tire-to-ground friction capacity. The at least one controller is further configured to determine the wheel speed signal accuracies based on the first information, the second information, the tire-to-ground friction capacity, a wheel geometry associated with one or more of the plural wheels, and one or more wheel inertias of the plural wheels.

In another embodiment, a system (e.g., control system for a vehicle) includes plural wheel speed sensors respectively associated with plural wheels of a vehicle. (The plural wheels may include a right rear wheel, a left rear wheel, a right front wheel, and a left front wheel, e.g., generally disposed at the four corners of the vehicle.) The system further includes at least one controller, and an electric drive system that is associated with at least two of the plural wheels. The electric drive system is configured to selectively provide electric motive power to the at least two of the plural wheels of the vehicle to propel the vehicle and electric retarding to slow the vehicle. The at least one controller is in electrical communication with the wheel speed sensors and is configured to receive wheel speed signals from the wheel speed sensors indicative of wheel speeds of the plural wheels. The at least one controller is further configured to control the vehicle based on determined respective wheel speed signal accuracies of the wheel speed signals. In particular, the at least one controller is configured to: at least one of determine or receive first information relating to operation of the electric drive system; at least one of determine or receive second information relating to operation of a friction brake system operably coupled with at least one of the plural wheels; and determine a tire-to-ground friction capacity. The at least one controller is further configured to determine the wheel speed signal accuracies based on the first information, the second information, the tire-to-ground friction capacity, a wheel geometry associated with one or more of the plural wheels, and one or more wheel inertias of the plural wheels. The at least one controller is further configured to at least one of receive or determine a baseline ground speed of the vehicle and a direction of travel of the vehicle, based at least in part on third information generated by a position system onboard the vehicle. The at least one controller is further configured to: receive yaw information from at least one yaw sensor on board the vehicle; determine an angular motion of the vehicle based at least in part on the wheel speed signals, the wheel speed signal accuracies, the yaw information, and a vehicle geometry; and determine respective true ground speeds and directions of travel of the plural wheels based at least in part on the baseline ground speed, the direction of travel of the vehicle, and the angular motion of the vehicle. (The at least one yaw sensor from which the at least one controller is configured to receive the yaw information may include a first yaw sensor positioned at a front end of the vehicle and a second yaw sensor positioned at a rear end of the vehicle.)

In another embodiment of the system, the at least one controller is further configured to determine if at least one of one or more of the plural wheels or the vehicle are at least one of spinning or sliding based at least in part on the true ground speeds and directions of travel of the plural wheels, the vehicle geometry, the wheel speed signals, and the wheel speed signal accuracies. If so, the at least one controller determines a center of rotation of the vehicle based on least in part on the yaw information and one or more of the true ground speeds and directions of travel of the plural wheels, the vehicle geometry, the wheel speed signals, the wheel speed signal accuracies, the first information, the second information, the wheel geometry, the one or more wheel inertias, the baseline ground speed of the vehicle, the direction of travel of the vehicle, or the tire-to-ground friction capacity. The at least one controller may be configured to control the electric retarding of the electric drive system based on the center of rotation and the true ground speeds of the plural wheels to at least one of reduce or eliminate the at least one of the spinning or sliding.

In an embodiment, a system (e.g., control system) includes an electric drive system associated with at least a least the rear two wheels of a vehicle. The electric drive system is configured to selectively provide electric motive power to the rear wheels of the vehicle to propel the vehicle and electric retarding to slow the vehicle. The system further includes a friction brake system associated with at least a front set of wheels of the vehicle, and at least one controller for selectively actuating the electric drive system to operate in an electric retarding mode and for selectively actuating the friction brake system. The at least one controller is configured to control the electric drive system and the friction brake system for a transfer of retarding force from the rear wheels to the front wheels in dependence at least in part upon a determined slip of the rear wheels. Alternatively or additionally, the at least one controller may be configured to control the electric drive system and the friction brake system for the transfer of retarding force from the rear wheels to the front wheels in dependence at least in part upon a determined amount of available retarding force at the rear wheels and/or a determined amount of available retarding force at the front wheels (e.g., braking capacity of friction brakes or secondary electric retarding, or tire-to-ground friction capacity).

In another embodiment, a method of controlling a vehicle includes receiving, at one or more controllers, wheel speed signals from plural wheel speed sensors respectively associated with plural wheels of the vehicle. (The plural wheels may include a right rear wheel, a left rear wheel, a right front wheel, and a left front wheel.) The method further includes determining, with the one or more controllers, respective wheel speed signal accuracies of the wheel speed signals, and controlling electric retarding provided by an electric drive system associated with at least two of the plural wheels. The electric drive system is configured to selectively provide electric motive power to the at least two of the plural wheels of the vehicle to propel the vehicle and the electric retarding to slow the vehicle. The electric retarding is controlled based at least in part on the wheel speed signals and the wheel speed signal accuracies to reduce and/or eliminate spinning or sliding of the vehicle and/or vehicle wheels.

In another embodiment, a method of controlling a vehicle includes receiving, at one or more controllers, wheel speed signals from plural wheel speed sensors respectively associated with plural wheels of the vehicle. (The plural wheels may include a right rear wheel, a left rear wheel, a right front wheel, and a left front wheel.) The method further includes determining, with the one or more controllers, respective wheel speed signal accuracies of the wheel speed signals, and controlling electric retarding provided by an electric drive system associated with at least two of the plural wheels. The electric drive system is configured to selectively provide electric motive power to the at least two of the plural wheels of the vehicle to propel the vehicle and the electric retarding to slow the vehicle. The electric retarding is controlled based at least in part on the wheel speed signals and the wheel speed signal accuracies to reduce and/or eliminate spinning or sliding of the vehicle and/or vehicle wheels. The method further comprises at least one of determining or receiving first information relating to operation of the electric drive system; at least one of determining or receiving second information relating to operation of a friction brake system operably coupled with at least one of the plural wheels; and determining a tire-to-ground friction capacity. The wheel speed signal accuracies are determined based on the first information, the second information, the tire-to-ground friction capacity, a wheel geometry associated with one or more of the plural wheels, and one or more wheel inertias of the plural wheels.

In another embodiment, a method of controlling a vehicle includes receiving, at one or more controllers, wheel speed signals from plural wheel speed sensors respectively associated with plural wheels of the vehicle. (The plural wheels may include a right rear wheel, a left rear wheel, a right front wheel, and a left front wheel.) The method further includes determining, with the one or more controllers, respective wheel speed signal accuracies of the wheel speed signals, and controlling electric retarding provided by an electric drive system associated with at least two of the plural wheels. The electric drive system is configured to selectively provide electric motive power to the at least two of the plural wheels of the vehicle to propel the vehicle and the electric retarding to slow the vehicle. The electric retarding is controlled based at least in part on the wheel speed signals and the wheel speed signal accuracies to reduce and/or eliminate spinning or sliding of the vehicle and/or vehicle wheels. The method further comprises at least one of determining or receiving first information relating to operation of the electric drive system; at least one of determining or receiving second information relating to operation of a friction brake system operably coupled with at least one of the plural wheels; and determining a tire-to-ground friction capacity. The wheel speed signal accuracies are determined based on the first information, the second information, the tire-to-ground friction capacity, a wheel geometry associated with one or more of the plural wheels, and one or more wheel inertias of the plural wheels. The method further comprises at least one of determining or receiving a baseline ground speed of the vehicle and a direction of travel of the vehicle, based at least in part on third information generated by a position system onboard the vehicle; receiving yaw information from at least one yaw sensor on board the vehicle; determining an angular motion of the vehicle based at least in part on the wheel speed signals, the wheel speed signal accuracies, the yaw information, and a vehicle geometry; and determining respective true ground speeds and directions of travel of the plural wheels based at least in part on the baseline ground speed, the direction of travel of the vehicle, and the angular motion of the vehicle.

In another embodiment, a method of controlling a vehicle includes receiving, at one or more controllers, wheel speed signals from plural wheel speed sensors respectively associated with plural wheels of the vehicle. (The plural wheels may include a right rear wheel, a left rear wheel, a right front wheel, and a left front wheel.) The method further includes determining, with the one or more controllers, respective wheel speed signal accuracies of the wheel speed signals, and controlling electric retarding provided by an electric drive system associated with at least two of the plural wheels. The electric drive system is configured to selectively provide electric motive power to the at least two of the plural wheels of the vehicle to propel the vehicle and the electric retarding to slow the vehicle. The electric retarding is controlled based at least in part on the wheel speed signals and the wheel speed signal accuracies to reduce and/or eliminate spinning or sliding of the vehicle and/or vehicle wheels. The method further comprises at least one of determining or receiving first information relating to operation of the electric drive system; at least one of determining or receiving second information relating to operation of a friction brake system operably coupled with at least one of the plural wheels; and determining a tire-to-ground friction capacity. The wheel speed signal accuracies are determined based on the first information, the second information, the tire-to-ground friction capacity, a wheel geometry associated with one or more of the plural wheels, and one or more wheel inertias of the plural wheels. The method further comprises at least one of determining or receiving a baseline ground speed of the vehicle and a direction of travel of the vehicle, based at least in part on third information generated by a position system onboard the vehicle; receiving yaw information from at least one yaw sensor on board the vehicle; determining an angular motion of the vehicle based at least in part on the wheel speed signals, the wheel speed signal accuracies, the yaw information, and a vehicle geometry; and determining respective true ground speeds and directions of travel of the plural wheels based at least in part on the baseline ground speed, the direction of travel of the vehicle, and the angular motion of the vehicle. The method further comprises determining if at least one of one or more of the plural wheels or the vehicle are at least one of spinning or sliding based at least in part on the true ground speeds and directions of travel of the plural wheels, the vehicle geometry, the wheel speed signals, and the wheel speed signal accuracies; and if so, determining a center of rotation of the vehicle based on least in part on the yaw information and one or more of the true ground speeds and directions of travel of the plural wheels, the vehicle geometry, the wheel speed signals, the wheel speed signal accuracies, the first information, the second information, the wheel geometry, the one or more wheel inertias, the baseline ground speed of the vehicle, the direction of travel of the vehicle, or the tire-to-ground friction capacity. The electric retarding is controlled based at least in part on the center of rotation and the true ground speeds of the plural wheels to at least one of reduce or eliminate the at least one of the spinning or sliding.

In another embodiment, a system comprises plural wheel speed sensors respectively associated with plural wheels of a vehicle. The plural wheels may comprise a right rear wheel, a left rear wheel, a right front wheel, and a left front wheel. The system further comprises an electric drive system associated with at least two of the plural wheels. The electric drive system is configured to selectively provide electric motive power to the at least two of the plural wheels of the vehicle to propel the vehicle and electric retarding to slow the vehicle. The system further comprises at least one controller in electrical communication with the wheel speed sensors and configured to receive wheel speed signals from the wheel speed sensors indicative of wheel speeds of the plural wheels. The at least one controller is configured to control the electric retarding of the electric drive system based in part on determined respective wheel speed signal accuracies of the wheel speed signals, to at least one of reduce or eliminate at least one of spinning or sliding of at least one of one or more of the plural wheels or the vehicle.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, "electrical communication" or "electrically coupled" means that certain components are configured to communicate with one another through direct or indirect signaling by way of direct or indirect electrical connections. Also, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the embodiments described herein, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A system comprising:
    plural wheel speed sensors respectively associated with plural wheels of a vehicle;
    an electric drive system associated with at least two of the plural wheels, the electric drive system being configured to selectively provide electric motive power to the at least two of the plural wheels of the vehicle to propel the vehicle and electric retarding to slow the vehicle; and
    at least one controller in electrical communication with the wheel speed sensors and configured to receive wheel speed signals from the wheel speed sensors indicative of wheel speeds of the plural wheels;
    wherein the at least one controller is configured to control the vehicle based on determined respective wheel speed signal accuracies of the wheel speed signals;
    wherein the at least one controller is configured to:
        at least one of determine or receive first information relating to operation of the electric drive system;
        at least one of determine or receive second information relating to operation of a friction brake system operably coupled with at least one of the plural wheels, the friction brake system configured to slow the vehicle during movement of the vehicle; and
        determine a tire-to-ground friction capacity;
    and wherein the at least one controller is configured to determine the wheel speed signal accuracies based on the first information, the second information, the tire-to-ground friction capacity, a wheel geometry associated with one or more of the plural wheels, and one or more wheel inertias of the plural wheels.

2. The system of claim 1, wherein the at least one controller is configured to:
    at least one of receive or determine a baseline ground speed of the vehicle and a direction of travel of the vehicle, based at least in part on third information generated by a position system onboard the vehicle;
    receive yaw information from at least one yaw sensor on board the vehicle;
    determine an angular motion of the vehicle based at least in part on the wheel speed signals, the wheel speed signal accuracies, the yaw information, and a vehicle geometry; and
    determine respective true ground speeds and directions of travel of the plural wheels based at least in part on the baseline ground speed, the direction of travel of the vehicle, and the angular motion of the vehicle.

3. The system of claim 2, wherein the at least one yaw sensor from which the at least one controller is configured to receive the yaw information comprises a first yaw sensor positioned at a front end of the vehicle and a second yaw sensor positioned at a rear end of the vehicle.

4. The system of claim 2, wherein the at least one controller is configured:
    to determine if at least one of one or more of the plural wheels or the vehicle are at least one of spinning or sliding based at least in part on the true ground speeds and directions of travel of the plural wheels, the vehicle geometry, the wheel speed signals, and the wheel speed signal accuracies; and
    if so, to determine a center of rotation of the vehicle based on least in part on the yaw information and one or more of the true ground speeds and directions of travel of the plural wheels, the vehicle geometry, the wheel speed signals, the wheel speed signal accuracies, the first information, the second information, the wheel geometry, the one or more wheel inertias, the baseline ground speed of the vehicle, the direction of travel of the vehicle, or the tire-to-ground friction capacity.

5. The system of claim 4, wherein the at least one controller is configured to control the electric retarding of the electric drive system based on the center of rotation and the true ground speeds of the plural wheels to at least one of reduce or eliminate the at least one of the spinning or sliding.

6. The system of claim 1, wherein the at least one controller is configured to control the electric retarding of the electric drive system based in part on the wheel speed signals and the wheel speed signal accuracies, to at least one of reduce or eliminate at least one of spinning or sliding of at least one of one or more of the plural wheels or the vehicle.

7. The system of claim 1, wherein the plural wheels comprise four wheels, and wherein the plural wheel speed sensors comprise four wheel speed sensors respectively associated with the four wheels.

8. A method of controlling a vehicle, comprising:
    receiving, at one or more controllers, wheel speed signals from plural wheel speed sensors respectively associated with plural wheels of the vehicle;
    determining, with the one or more controllers, respective wheel speed signal accuracies of the wheel speed signals; and
    controlling, with the one or more controllers, electric retarding provided by an electric drive system associated with at least two of the plural wheels, the electric drive system being configured to selectively provide electric motive power to the at least two of the plural wheels of the vehicle to propel the vehicle and the electric retarding to slow the vehicle;

wherein the electric retarding is controlled based at least in part on the wheel speed signals and the wheel speed signal accuracies to at least one of reduce or eliminate at least one of spinning or sliding of at least one of one or more of the plural wheels or the vehicle;

wherein the method further comprises:
at least one of determining or receiving first information relating to operation of the electric drive system;
at least one of determining or receiving second information relating to operation of a friction brake system operably coupled with at least one of the plural wheels, the friction brake system configured to slow the vehicle during movement of the vehicle; and
determining a tire-to-ground friction capacity;

and wherein the wheel speed signal accuracies are determined based on the first information, the second information, the tire-to-ground friction capacity, a wheel geometry associated with one or more of the plural wheels, and one or more wheel inertias of the plural wheels.

9. The method of claim 8, further comprising:
at least one of determining or receiving a baseline ground speed of the vehicle and a direction of travel of the vehicle, based at least in part on third information generated by a position system onboard the vehicle;
receiving yaw information from at least one yaw sensor on board the vehicle;
determining an angular motion of the vehicle based at least in part on the wheel speed signals, the wheel speed signal accuracies, the yaw information, and a vehicle geometry; and
determining respective true ground speeds and directions of travel of the plural wheels based at least in part on the baseline ground speed, the direction of travel of the vehicle, and the angular motion of the vehicle.

10. The method of claim 9, further comprising:
determining if at least one of one or more of the plural wheels or the vehicle are at least one of spinning or sliding based at least in part on the true ground speeds and directions of travel of the plural wheels, the vehicle geometry, the wheel speed signals, and the wheel speed signal accuracies; and
if so, determining a center of rotation of the vehicle based on least in part on the yaw information and one or more of the true ground speeds and directions of travel of the plural wheels, the vehicle geometry, the wheel speed signals, the wheel speed signal accuracies, the first information, the second information, the wheel geometry, the one or more wheel inertias, the baseline ground speed of the vehicle, the direction of travel of the vehicle, or the tire-to-ground friction capacity;
wherein the electric retarding is controlled based at least in part on the center of rotation and the true ground speeds of the plural wheels to at least one of reduce or eliminate the at least one of the spinning or sliding.

11. The method of claim 8, wherein the plural wheels comprise four wheels, and wherein the plural wheel speed sensors comprise four wheel speed sensors respectively associated with the four wheels.

12. A system comprising:
plural wheel speed sensors respectively associated with plural wheels of a vehicle;
an electric drive system associated with at least two of the plural wheels, the electric drive system being configured to selectively provide electric motive power to the at least two of the plural wheels of the vehicle to propel the vehicle and electric retarding to slow the vehicle; and
at least one controller in electrical communication with the wheel speed sensors and configured to receive wheel speed signals from the wheel speed sensors indicative of wheel speeds of the plural wheels;
wherein the at least one controller is configured to control the vehicle based on determined respective wheel speed signal accuracies of the wheel speed signals;
wherein the at least one controller is configured to:
at least one of determine or receive first information relating to operation of the electric drive system;
at least one of determine or receive second information relating to operation of a friction brake system operably coupled with at least one of the plural wheels; and
determine a tire-to-ground friction capacity;
wherein the at least one controller is configured to determine the wheel speed signal accuracies based on the first information, the second information, the tire-to-ground friction capacity, a wheel geometry associated with one or more of the plural wheels, and one or more wheel inertias of the plural wheels;
and wherein the at least one controller is configured to:
at least one of receive or determne a baseline ground speed of the vehicle and a direction of travel of the vehicle, based at least in part on third information generated by a position system onboard the vehicle;
receive yaw information from at least one yaw sensor on board the vehicle;
determine an angular motion of the vehicle based at least in part on the wheel speed signals, the wheel speed signal accuracies, the yaw information, and a vehicle geometry;
determine respective true ground speeds and directions of travel of the plural wheels based at least in part on the baseline ground speed, the direction of travel of the vehicle, and the angular motion of the vehicle;
determine if at least one of one or more of the plural wheels or the vehicle are at least one of spinning or sliding based at least in part on the true ground speeds and directions of travel of the plural wheels, the vehicle geometry, the wheel speed signals, and the wheel speed signal accuracies; and
if so, to determine a center of rotation of the vehicle based on least in part on the yaw information and one or more of the true ground speeds and directions of travel of the plural wheels, the vehicle geometry, the wheel speed signals, the wheel speed signal accuracies, the first information, the second information, the wheel geometry, the one or more wheel inertias, the baseline ground speed of the vehicle, the direction of travel of the vehicle, or the tire-to-ground friction capacity.

13. The system of claim 12, wherein the at least one controller is configured to control the electric retarding of the electric drive system based on the center of rotation and the true ground speeds of the plural wheels to at least one of reduce or eliminate the at least one of the spinning or sliding.

* * * * *